United States Patent [19]

Knope et al.

[11] 4,239,828
[45] Dec. 16, 1980

[54] SELF-LUBRICATING MAGNETIC RECORDING DISKETTE

[75] Inventors: Constance J. Knope, Roseville; Kent A. Kirkevold, Woodbury, both of Minn.

[73] Assignee: Minnesota Mining and Manufacturing Company, St. Paul, Minn.

[21] Appl. No.: 671,573

[22] Filed: Mar. 29, 1976

Related U.S. Application Data

[63] Continuation of Ser. No. 512,474, Oct. 7, 1974, abandoned.

[51] Int. Cl.² .............................................. B32B 3/02
[52] U.S. Cl. ..................................... 428/64; 427/131; 428/421; 428/900
[58] Field of Search ................................ 427/128–132; 428/539, 900, 64, 421

[56] References Cited

U.S. PATENT DOCUMENTS

| 3,319,012 | 5/1967 | Reed et al. ...................... 117/236 X |
| 3,398,011 | 8/1968 | Neirotti et al. .................. 117/237 X |
| 3,630,910 | 12/1971 | Akashi et al. .................. 117/239 X |
| 3,668,658 | 6/1972 | Flores et al. ................... 206/303 X |
| 3,778,308 | 12/1973 | Roller et al. ................... 117/237 X |

Primary Examiner—Bernard D. Pianalto

[57] ABSTRACT

A flexible magnetic recording disk is contained in an envelope having a wiping fabric which is impregnated with a highly fluorinated alkyl polyether which transfers to the disk as it rotates within the envelope to lubricate the interface between the rotating disk and a magnetic recording head.

9 Claims, 1 Drawing Figure

U.S. Patent
Dec. 16, 1980
4,239,828
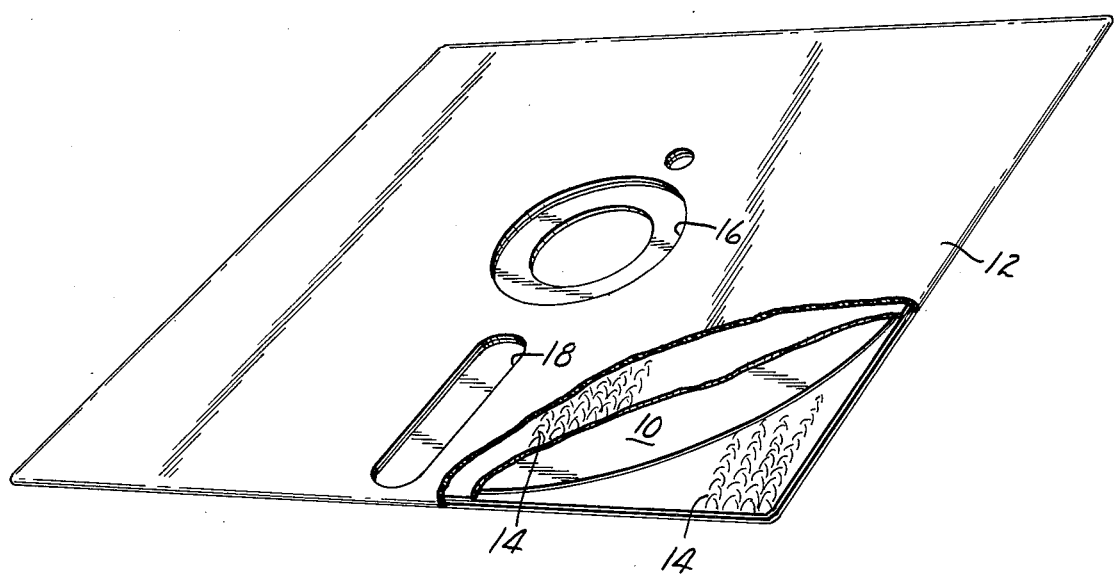

SELF-LUBRICATING MAGNETIC RECORDING DISKETTE

This is a continuation of application Ser. No. 512,474 filed Oct. 7, 1974 and now abandoned.

FIELD OF THE INVENTION

This invention concerns a magnetic recording medium of the type that is called the diskette which comprises a flexible magnetic recording disk contained in an envelope to which is attached a wiping fabric in facing relationship to the disk. An early form of the diskette is disclosed in U.S. Pat. No. 3,668,658 (Flores et al.)

BACKGROUND OF THE INVENTION

Diskettes are widely used as storage media for digital data. Virtually error-free performance is expected. The aforementioned U.S. Pat. No. 3,668,658 showed that error-free performance could be enhanced by continuously wiping the disk with a porous, low-friction, antistatic dusting fabric. To prolong the life of the disk by minimizing wear as the disk moves in contact with a magnetic recording head, the disk has been provided with various lubricants. Nevertheless, there has been a continuing demand for longer disk life, some users insisting that the disk should withstand one million passes of continuous contact with the head along a single track without a signal dropout and even asking for four million errorfree passes or more.

OTHER PRIOR ART

U.S. Pat. No. 3,778,308 (Roller et al.) discloses the use of certain lubricants for coating magnetic recording media, primarily the type that spin at such high speeds as to generate aerodynamic films of air between the media and the magnetic recording heads. Although normally out of contact, the heads may accidentally strike the media during starting or stopping. The lubricants are designed to minimize damage to the heads and media due to accidental contact. The patent indicates that the lubricants may also be used to coat magnetic recording media designed to be moved in contact with a read-write head, and that in such use, friction is reduced while extending the useful life of both the media and the head. Lubricants disclosed in U.S. Pat. No. 3,778,308 would be useful in the present invention.

THE PRESENT INVENTION

The present invention significantly advances the diskette art by greatly prolonging the useful life of the disk. This is accomplished by applying to the wiping fabric a dilute solution of a highly fluorinated alkyl polyether having a viscosity index (ASTM D 2270) of about 10-130 and then evaporating the solvent. Particularly preferred are highly fluorinated ethyl polyethers having the repeating unit

—CF$_2$—CF$_2$—O— and propyl polyethers having the repeating unit

—CF—CF$_2$—O—
    |
    CF$_3$ such as 

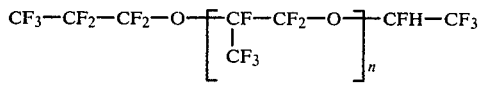

and the dimer thereof:

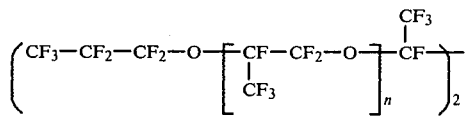

where n is an integer providing a viscosity index (ASTM D 2270) of about 10-130. Such polymers are available commercially from E. I. du Pont de Nemours & Co. as Series E fluids and dimers thereof which are designated "Krytox" 143.

The highly fluorinated alkyl polyether is preferably applied by drawing long lengths of the fabric continuously through a bath containing about 0.1 to 1.0 part of the polyether per 100 parts of a solvent such as CCl$_2$FCClF$_2$. A lesser proportion of the polyether in the solution tends to result in insufficient deposit of the polyether on the fabric whereas higher proportions of the polyether are considered less economical. Adequate impregnation is achieved when the fabric is advanced at a rate such that the fabric is immersed for about 1 to 20 seconds. Normally, the solvent evaporates in air at ordinary room temperatures within one minute after the fabric is withdrawn from the bath. Desirably, the dried fabric contains 1-20 parts by weight of the polyether per 100 parts by weight of the fabric. Lesser amounts do not provide error-free performance for periods as long as do amounts within that range, whereas greater amounts are considered to be unnecessary and expensive and may produce an esthetically undesirable visual pattern on the disk.

The wiping fabric should be a nonwoven, porous, tissue-like material of synthetic fibers which are insoluble in solvents for fluorocarbon polymers. Preferably the fabric is made from two fibers, one of which is employed at a relatively low proportion and initially has a lower softening point than the other and is partially fused during fabrication to act as an adhesive joining the higher-softening fibers into a coherent fabric of the type generally disclosed in U.S. Pat. No. 2,676,128 (Piccard). A preferred fabric consists of 80 parts by weight of rayon fibers and 20 parts by weight of polypropylene fibers which bond the rayon fibers together. The weight of the fabric may be 10-100 (preferably 20-45) grams per square meter. Fabric having a weight below that range may be unduly fragile whereas a heavier fabric would tend to be too thick to meet current industry specifications for the diskette.

BRIEF DESCRIPTION OF THE FIGURE

The single FIGURE of the drawing is a perspective view of a diskette, cut away to show details.

In the drawing, a magnetic recording disk 10 is positioned within a flexible, shape-retaining plastic envelope 12. A porous, nonwoven, tissue-like fabric 14 attached to the inner walls of the envelope is impregnated with highly fluorinated alkyl polyether lubricant (not shown).

In use, the disk 10 is rotatively driven at its central opening 16 while the envelope remains stationary, and a magnetic recording head (not shown) contacts the rotating disk through either of the identical oval apertures 18 in each of the side walls of the envelope. As the disk 10 rotates, it lightly contacts the fabric 14, and the polyether lubricant gradually transfers to the surface of the disk to provide continuous lubrication between the head and the disk.

EXAMPLE

A diskette as illustrated in the drawing was prepared using a nonwoven wiping fabric consisting of 80 parts by weight of rayon fibers of approximately 1.5 denier and 20 parts by weight of polypropylene fibers of approximately 1.5 denier which have been fused together to afford integrity to the fabric. The weight of the fabric was about 36 grams per square meter. The fabric was obtained from Kendall Company as Novonette No. H 854.

The fabric was immersed for 15 seconds into a solution of approximately one part by weight of a solute comprising a highly fluorinated propyl polyether (viz., "Krytox" 143AZ) in 100 parts by weight of the solvent $CCl_2FCClF_2$ (viz., "Freon" 113). It is believed that part of the solute was a telomer of $F_2C=CF_2$. The viscosity index (ASTM D 2270) of the solute was 23, its density at 24° C. was 1.86 g/ml and its boiling point range at 0.8 mm Hg was 143°–185° C. Within 45 seconds after being withdrawn from the bath, the solvent had substantially evaporated in air at room temperature. Solvent extraction indicated the presence of 11 parts by weight of the solute per 100 parts by weight of the fabric.

The treated fabric was cut to shape and attached to the envelope material at areas adjacent the openings and edges and at intermediate areas by a single pass of a roll having knurled sections of about 3 mm in width which had been preheated to 175° C. The envelope material was a film of a copolymer of about 90 parts by weight of vinyl chloride and 10 parts by weight of vinyl acetate containing about 10% carbon particles and having a matte surface. The temperature of the knurl roll was sufficient to fuse the fabric to the vinyl film without observable change in the overall porosity of the fabric. Attempts to remove the fabric resulted in its delamination at the fused areas.

The magnetic recording disk was of conventional construction, having a backing of biaxially-oriented polyethylene terephthalate film 0.08 mm in thickness and a 0.003 mm coating of acicular $\gamma$-$Fe_2O_3$ particles in binder on each surface. The coatings were polished to a surface roughness not exceeding 0.08 micrometer. The envelope and fabric were folded and two edges were heat-sealed followed by insertion of the disk and sealing of the third edge to provide a permanent enclosure for the disk as shown in the drawing.

This diskette was tested by rotating the disk in contact with a magnetic recording head along a single track continuously except for periodic tests for dropouts in a Shugart Certifier, Model 3A-3905. A dropout was not detected after two million passes, at which point the test was discontinued. An otherwise identical diskette except for omission of the lubricant showed a dropout within 160,000 passes.

We claim:

1. Method of extending the useful life of a flexible magnetic recording disk which is contained in an envelope to which a wiping fabric is attached in facing relationship to the disk comprising the steps of
   (1) applying to the wiping fabric a dilute solution of a lubricant primarily comprising a highly fluorinated alkyl polyether having a viscosity index as herein defined of about 10–130, and
   (2) evaporating the solvent to provide about 1–20 parts by weight of the lubricant per 100 parts by weight of the fabric.

2. Method as defined in claim 1 wherein the fabric is immersed in the solution for about 1–20 seconds and then dried by exposure to air at ordinary room temperature.

3. Method as defined in claim 2 wherein the solution contains about 0.1 to one part by weight of the lubricant per 100 parts by weight of the solvent.

4. A diskette comprising an envelope containing a flexible magnetic recording disk and a tissue-like wiping fabric attached to the envelope in facing relationship to the disk, characterized by the fact that
   the fabric is impregnated with a lubricant primarily comprising a highly fluorinated alkyl polyether having a viscosity index as herein defined of about 10–130, there being about 1–20 parts by weight of the polyether per 100 parts by weight of the fabric.

5. A diskette according to claim 4 further characterized by the fact that said polyether comprises a major proportion of the lubricant and a telomer of $F_2C=CF_2$ comprises a minor proportion of the lubricant.

6. A diskette according to claim 4 further characterized by the fact that said polyether is a highly fluorinated propyl polyether and comprises a major proportion of the lubricant and a telomer of $F_2C=CF_2$ comprises a minor proportion of the lubricant.

7. A diskette as defined in claim 4 further characterized by the fact that said polyether is selected from the group consisting of

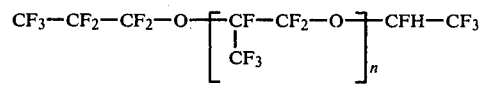

and the dimer thereof:

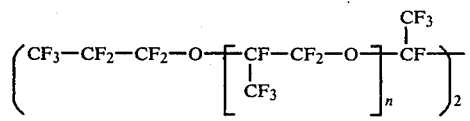

where n is an integer providing a viscosity index of 10–130.

8. A diskette as defined in claim 7 further characterized by the fact that said polyether is the dimer having a viscosity index of about 23 and there are about 11 parts by weight of the lubricant per 100 parts by weight of the fabric.

9. A diskette as defined in claim 8 further characterized by the fact that a telomer of $F_2C=CF_2$ comprises a minor proportion of said lubricant.

* * * * *